United States Patent
Liu

(10) Patent No.: US 9,678,612 B2
(45) Date of Patent: Jun. 13, 2017

(54) SINGLE LAYERED ELECTRODE STRUCTURE

(71) Applicant: MStar Semiconductor, Inc., Hsinchu Hsien (TW)

(72) Inventor: Tzu-Wei Liu, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 234 days.

(21) Appl. No.: 14/464,003

(22) Filed: Aug. 20, 2014

(65) Prior Publication Data

US 2015/0054782 A1 Feb. 26, 2015

(30) Foreign Application Priority Data

Aug. 20, 2013 (TW) .............................. 102129834 A

(51) Int. Cl.
*G06F 3/044* (2006.01)
(52) U.S. Cl.
CPC .... *G06F 3/044* (2013.01); *G06F 2203/04108* (2013.01)
(58) Field of Classification Search
CPC ........................ G06F 3/044; G06F 2203/04108
USPC .................................................. 345/173, 174
See application file for complete search history.

(56) References Cited

U.S. PATENT DOCUMENTS

| 2011/0007030 A1* | 1/2011 | Mo ......................... G06F 3/044 345/174 |
| 2012/0227259 A1* | 9/2012 | Badaye ................... G06F 3/044 29/846 |
| 2012/0319974 A1* | 12/2012 | Kim ........................ G06F 3/044 345/173 |
| 2013/0100038 A1* | 4/2013 | Yilmaz ................... G06F 3/044 345/173 |
| 2014/0184527 A1* | 7/2014 | Kim ........................ G06F 3/044 345/173 |

(Continued)

FOREIGN PATENT DOCUMENTS

| CN | 101566895 | 10/2009 |
| CN | 103246422 | 8/2013 |
| TW | M442547 | 12/2012 |

OTHER PUBLICATIONS

Taiwan Intellectual Property Office, "Office Action," Jun. 10, 2015.

(Continued)

*Primary Examiner* — Premal Patel
(74) *Attorney, Agent, or Firm* — WPAT, PC; Justin King; Jonathan Chiang

(57) ABSTRACT

A single layered electrode structure includes a plurality of first electrode groups arranged along a first direction, a plurality of second electrode groups arranged along the first direction, and a plurality of third electrodes arranged along the first direction. Each of the first electrode groups includes at least one first electrode arranged along a second direction. Each of the second electrode groups includes a plurality of second electrodes arranged along the second direction, with each of the second electrodes at least corresponding to the at least one first electrode. Each of the third electrodes is arranged as one of combinations of between two of the first electrode groups, between two of the first electrode groups, and between one of the first electrode groups and one of the second electrode groups.

16 Claims, 10 Drawing Sheets

(56) References Cited

U.S. PATENT DOCUMENTS

2014/0293163 A1* 10/2014 Ju .................... G06F 3/044
            349/12
2015/0029129 A1* 1/2015 Trend ................ G06F 3/044
            345/174

OTHER PUBLICATIONS

China Patent Office "Office Action" issued on Dec. 28, 2016, China.

* cited by examiner

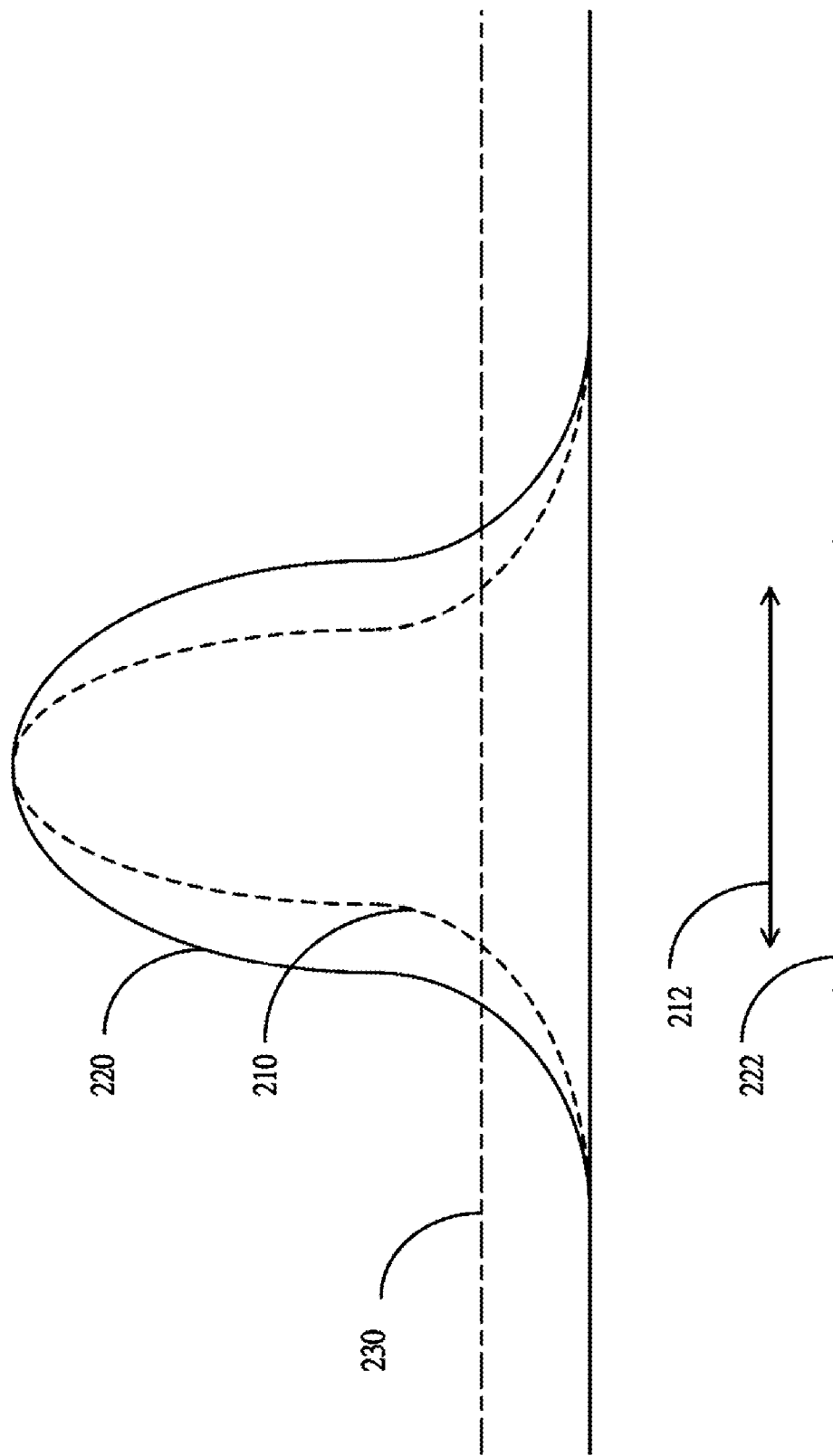

US 9,678,612 B2

SINGLE LAYERED ELECTRODE STRUCTURE

This application claims the benefit of Taiwan application Serial No. 102129834, filed Aug. 20, 2013, the subject matter of which is incorporated herein by reference.

BACKGROUND OF THE INVENTION

Field of the Invention

The invention relates in general to a touch device, and more particularly, to a single layered electrode structure of a touch device.

Description of the Related Art

Touch panels make a large scale industry. Various electronic products adopt touch panels as critical input/output devices for human-machine interfaces. The performance of touch panels depends on sensing electrodes and logic circuits connected thereto. Thus, the design and quality of the sensing electrodes dominates the performance of touch panels.

The sensing electrodes of a touch panel are generally formed on a transparent substrate. Light emitted from a display device penetrates the transparent substrate to reach a user. These sensing electrodes formed on the transparent substrate include multiple electrodes, which are connected to the logic circuits via multiple conducting wires.

With the compact trend of modern electronic products, the thickness of touch panels has become the critical factor of the thickness of touch screens. Further, multi-touch has become a fundamental function of human-machine interfaces. Thus, single layered and multi-point projected capacitive touch panels are currently one of the few touch panel forms that satisfy all of the above requirements.

With the constant increase resolution demand of display devices, the performance requirements of touch panels also become higher. To provide better performances including the resolution, precision, sensing speed for fast-moving objects for touch devices, more electrodes and conducting wires need to be fit into a limited touch area.

Projected capacitance touch sensing technique senses a capacitance value $C_m$ between a driving electrode and a sensing electrode when an external conductive object, e.g., a finger or a stylus, approaches or comes into contact with (to be referred to as coming into a proximity of) a touch panel. By detecting a total capacitance change, positions of coordinates of more than one proximity events can be learned. However, in addition to the capacitance value $C_m$ between the driving electrode and the sensing electrode, the external conductive object is also affected by a capacitance value $C_d$ between the external conductive object and the driving electrode, a capacitance value $C_s$ between the external conductive object and the sensing electrode, and a capacitance value $C_f$ between the external conductive object and a ground voltage. Especially in a touch area that is becoming more and more crowded as greater numbers of driving electrodes and sensing electrodes need to be fit therein, reducing the capacitance value $C_d$ and the capacitance value $C_s$ may be extremely challenging.

SUMMARY OF THE INVENTION

Therefore, the present invention provides an improved sensing electrode design for a single layered touch panel, so as to increase the ratio of the capacitance change $C_m$ to the total capacitance change to further enhance the accuracy for sensing proximity events of touch.

According to an embodiment of the present invention, a single layered electrode structure is provided. The single layered electrode structure includes a plurality of first electrode groups arranged along a first direction, a plurality of second electrode groups arranged along the first direction, and a plurality of third electrodes arranged along the first direction. Each of the first electrode groups includes at least one first electrode arranged along a second direction. Each of the second electrode groups includes a plurality of second electrodes arranged along the second direction, with each of the second electrodes at least corresponding to the at least one first electrode. Each of the third electrodes is arranged as one of combinations of between two of the first electrode groups, between two of the first electrode groups, and between one of the first electrode groups and one of the second electrode groups.

One main spirit of the present invention is that, a ground electrode and/or a dummy electrode are/is added in a space outside driving electrodes and sensing electrodes on a single layered substrate. Accordingly, when a proximity event takes place, a capacitance value of an external conductive object relative to a ground potential is increased to increase a capacitance change between the driving electrode and sensing electrode, thereby improving a signal-to-noise ratio (SNR) of the proximity event.

The above and other aspects of the invention will become better understood with regard to the following detailed description of the preferred but non-limiting embodiments. The following description is made with reference to the accompanying drawings.

BRIEF DESCRIPTION OF THE DRAWINGS

FIG. 2 is a schematic diagram of sensing amounts according to an embodiment of the present invention;

DETAILED DESCRIPTION OF THE INVENTION

Embodiments of the present invention are described in detail below. Apart from the disclosed embodiments, the present invention is also applicable to other embodiments. The scope of the present invention is not limited by these non-limiting embodiments, and is defined in accordance with the appended claims. To better describe the contents of the present invention to one person skilled in the art and to keep the drawings clear, certain sizes and other associated scales may be emphasized to appear exaggerated, with unrelated details not entirely depicted.

Figure 1:
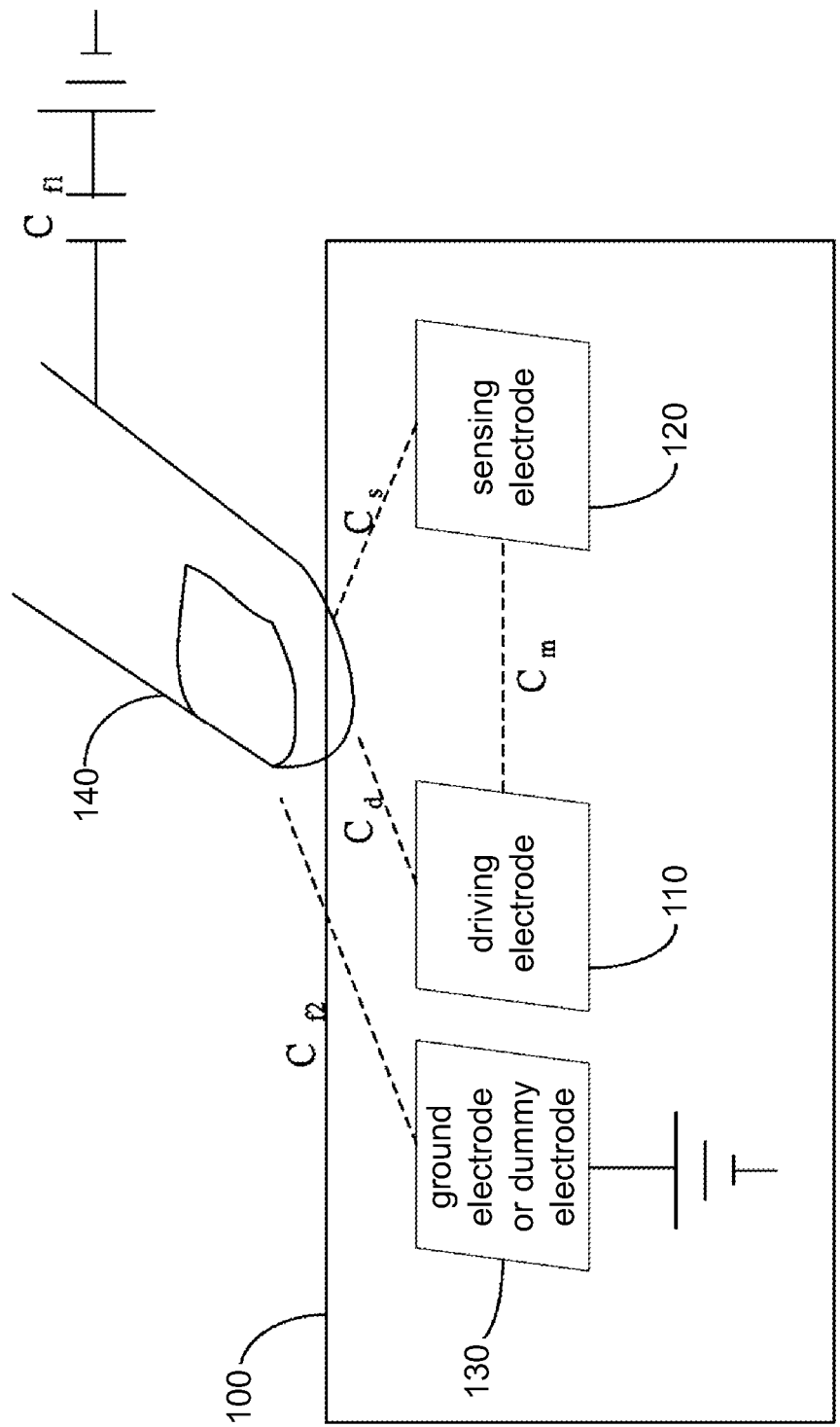
FIG. 1 is a schematic diagram of a touch device according to an embodiment of the present invention.

FIG. 1 shows a schematic diagram of a touch device 100 according to an embodiment of the present invention. In one embodiment, the touch device 100 is a projected capacitive touch device in a single layered structure. The single layered structure includes at least one first electrode or driving electrode 110, at least one second electrode or sensing electrode 120, and a third electrode 130 that may be referred to as a ground electrode or dummy electrode. The projected capacitive sensing technique is known to one person skilled in the art, and shall be omitted herein.

In one embodiment, the third electrode 130 or ground electrode is connected to a ground line of the touch device 100. In another embodiment, the third electrode 130 or dummy electrode may be independent at the single layered structure of the touch device, and is not connected to any external lines. For better illustrations, the third electrode 130 or dummy electrode is referred to as the third electrode 130.

When an external conductive object 140 such as a finger approaches or comes into contact with (to be referred to as coming into a proximity of) the touch device 100, several capacitance sensing results are generated, including a capacitance value $C_m$ between the driving electrode 110 and the sensing electrode 120, a capacitance value $C_d$ between the external conductive object 140 and the driving electrode 110, a capacitance value $C_s$ between the external conductive object 140 and the sensing electrode 120, and a capacitance value $C_{f2}$ between the external conductive object 140 and the third electrode 130. In addition to the capacitance value between the external conductive object 140 and the third electrode 130, the external conductive object 140 also provides a capacitance value $C_{f1}$, as the external conductive object 140 is grounded, e.g., a finger is grounded via the body. For illustration purposes, a capacitance value $C_f$ between the external conductive object 140 and the ground is regarded as a sum of the capacitance value $C_{f1}$, and the capacitance value $C_{f2}$.

For the projected capacitive touch device 100, when the external conductive object 140 comes into the proximity of the touch device 100, a sensing amount of the overall mutual capacitance may be represented by equation (1):

$$\Delta C_m + C_s * C_d/(C_s + C_d + C_f) \quad (1)$$

It is understood from equation (1) that, the capacitance change $\Delta C_m$ between the driving electrode 110 and the sensing electrode 120 is a signal that mutual capacitance sensing wishes to learn. As the value of the latter items $C_s*C_d/(C_s+C_d+C_f)$ of equation (1) gets smaller, the ratio of the capacitance change $\Delta C_m$ gets larger. In the present invention, a principle for reducing the value of the latter items is increasing the capacitance value $C_f$ in the denominator. Since the capacitance value $C_f$ is the sum of the capacitance values $C_{f1}$, and $C_{f2}$, the capacitance value $C_{f2}$ needs to increased as much as possible when the capacitance value $C_{f1}$, cannot be modified. Accordingly, the ratio of the capacitance change $\Delta C_m$ is enlarged to increase a signal-to-noise ratio (SNR) of detection.

FIG. 2 shows a schematic diagram of sensing amounts according to an embodiment of the present invention. In FIG. 2, the vertical axis represents the sensing amount occurring at adjacent sensing electrodes following a proximity event. A curve 210 indicates the sensing amount of the touch device 130 in FIG. 1 in the lack of the third electrode 130. A curve 220 indicates the sensing amount of the touch device 130 in FIG. 1 including of the third electrode 130. A straight line 230 indicates a threshold for filtering out noise sensing values.

Observed from FIG. 2, although the maximum sensing amounts are substantially the same, changes in a slope of the curve 220 are more moderate, whereas those of the curve 210 are steeper. In other words, the straight line 212 represents a part of the curve 220 that exceeds the threshold. It can be seen that a straight line 222 is longer than the straight line 212, which leads to a larger part of the curve 210 above the threshold, bringing a greater signal amount to the touch device 100.

Figure 3A:
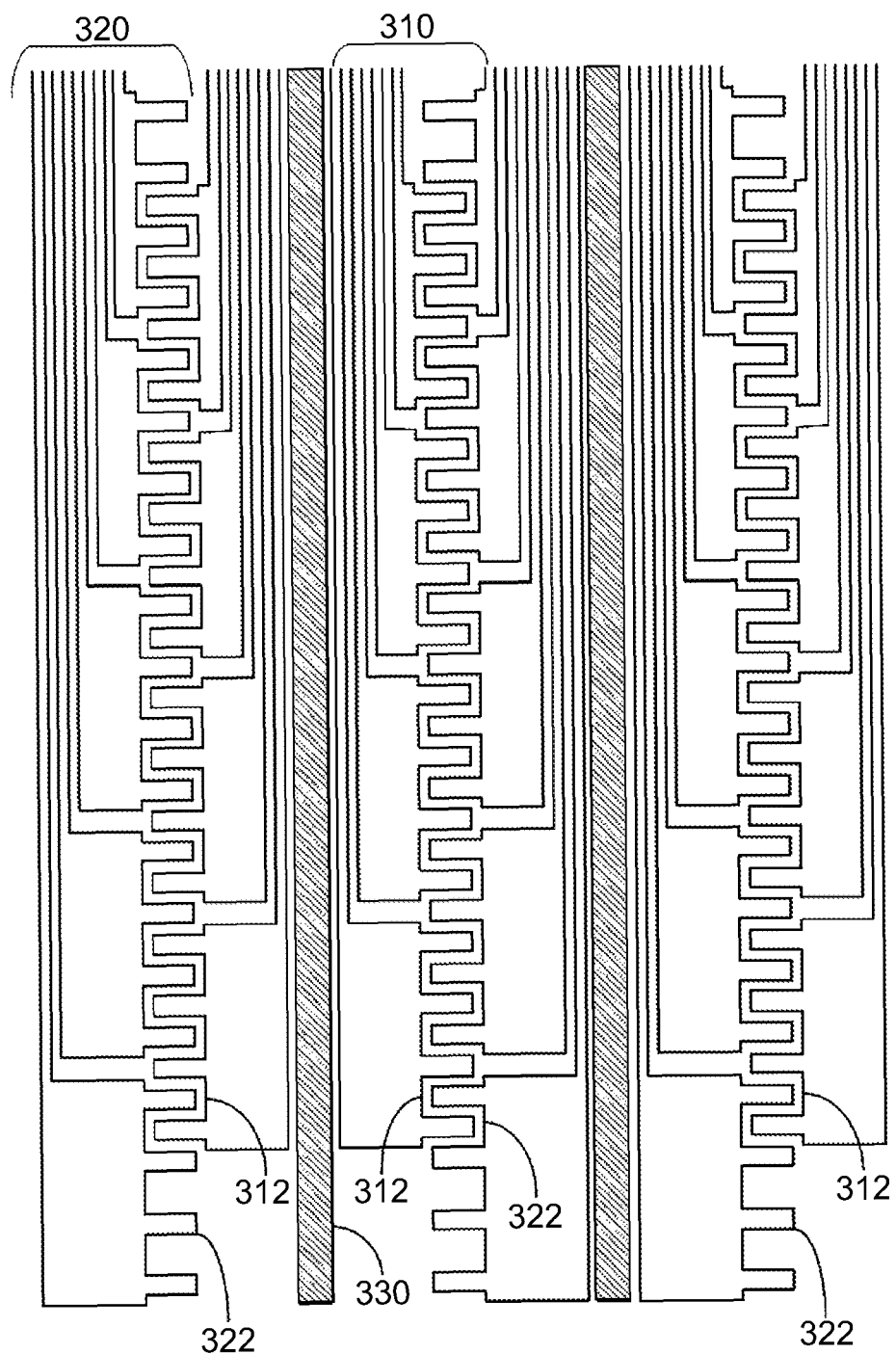
FIG. 3A is a schematic diagram of an electrode arrangement on a single layered substrate according to an embodiment of the present invention.

FIG. 3A shows a schematic diagram of an electrode arrangement on a single layered substrate according to an embodiment of the present invention. As shown, the single layered substrate includes a plurality of first electrode groups 310, a plurality of second electrode groups 320 and a plurality of third electrodes 330. Along the first direction (the horizontal direction), from left to right, the second electrode group 320, the first electrode group 310 and the third electrode 330 are sequentially arrange. Next, the first electrode group 310, the second electrode group 320 and the third electrode 330 are sequentially arranged.

Each of the first electrode groups 310 includes a plurality of first electrodes 312 arranged along a second direction (the vertical direction). Each of the second electrode groups 320 also includes a plurality of second electrodes 322 arranged along the second direction (the vertical direction). Each of the first electrodes 312 includes a plurality of twigs. Similarly, each of the second electrodes 322 also includes a plurality of twigs corresponding to the first electrodes 312. In the embodiment in FIG. 3A, the first electrodes 312 and the second electrodes 322 respectively have four twigs.

For every first electrodes 312 except the first and the last first electrode 312 of the first electrode group 310, positions of two upper twigs thereof correspond to positions of two lower twigs of one second electrode 322, and positions of two lower twigs thereof correspond to positions of two upper twigs of another second electrode 322. The former second electrode 322 is located above the latter second electrode 322. From a different perspective, for every second electrode 322 except the first and the last second electrode 322 of the second electrode group 320, positions of two upper twigs thereof correspond to positions of two lower twigs of one first electrode 312, and positions of two lower twigs thereof correspond to positions of two upper twigs of another first electrode 312. The former first electrode 312 is located above the latter second electrode 312.

Regarding the second electrode groups 320, at one side (the right side) of the second electrode groups 320, the second electrodes 322 correspond to the first electrodes 312 of the first electrode groups 310. At the other side (the left side) of the second electrode groups 320, conducting wires of the second electrodes 322 route along the second direction (the vertical direction) to the top. On the other hand, regarding the first electrode groups 310, at one side (the left side) of the first electrode groups 310, conducting wires of the first electrodes 312 correspond to the second electrodes 322 of the second electrode groups 320. At the other side (the right side) of the first electrode groups 310, conducting wires of the first electrodes 312 route along the second direction (the vertical direction) to the top. In other words, the first electrode groups 310 face the second electrode groups 320 and have the reverse side facing the third electrodes 330. Alternatively, the second electrode groups 310 face the first electrode groups 310, and have the reverse side facing the third electrodes 330.

As seen from FIG. 3A, the third electrode 330 on the left has its both sides adjacent to the first electrode groups 310, and the third electrode 330 on the right has its both sides adjacent to the second electrode groups 320. In the embodiment, the third electrodes 330 are adjacent to the same type of electrode groups, e.g., either the first electrode groups 310 or the second electrode groups 320. Further, the next third electrode 330 is adjacent to different types of electrode groups.

In one embodiment, the third electrodes may be ground electrodes connected to a ground potential, and have same widths along the second direction (the vertical direction). In another embodiment, the third electrodes 330 may be multiple ground electrodes arranged in parallel to the first direction (the horizontal direction). In another embodiment, the third electrodes may be dummy electrodes. Apart from having same conductive areas with equal widths, the third electrodes 330 implemented by dummy electrodes may be divided into a plurality of conductive areas and a plurality of dummy electrodes. All variations of dividing the dummy electrodes into areas of the third electrodes 330 are encompassed within the scope of the present invention.

In a preferred embodiment, a distance from a center of the third electrode 330 to a center of the next third electrode 330 may be between 5 mm and 7 mm.

Figure 3B:
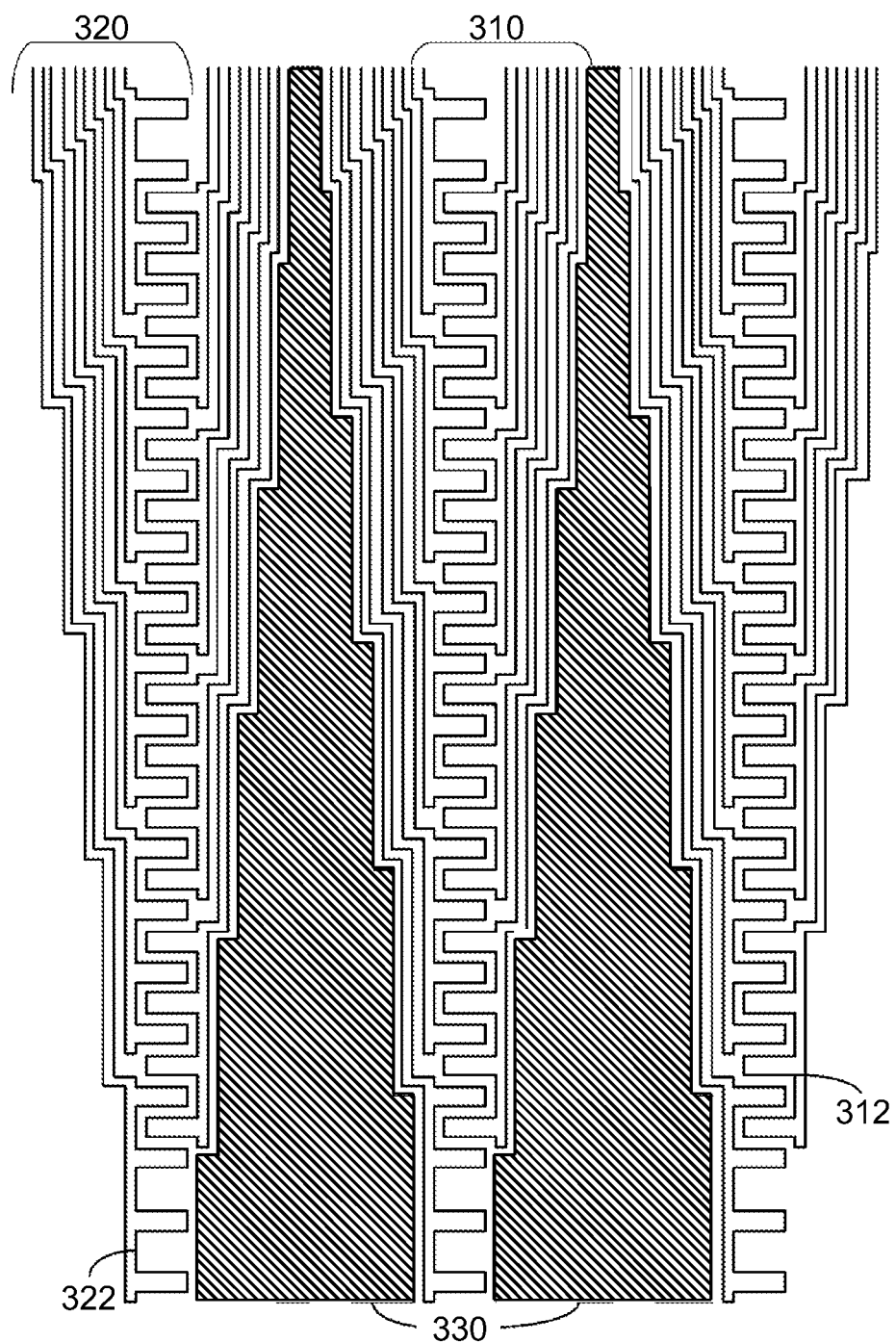
FIG. 3B is a schematic diagram of an electrode arrangement on a single layered substrate according to an embodiment of the present invention.

FIG. 3B shows a schematic diagram of an electrode arrangement on a single layered substrate according to an embodiment of the present invention. Compared to FIG. 3A, there are two noticeable differences. The first difference is the arrangement order. Along the first direction (the horizontal direction), from left to right, the second electrode groups 320, the first electrode groups 310 and the third electrode 330 are sequentially arranged. Such arrangement is repeated. Therefore, as seen from FIG. 3B, one side (the left side in FIG. 3B) of each of the third electrodes 330 is adjacent to the first electrode groups 310, and the other side (the right side in FIG. 3B) of each of the third electrodes 330 is adjacent to the second electrode groups 320. One person skilled in the art can understand that the arrangement orders in FIG. 3A and FIG. 3B are within the technical scope disclosed by the present invention.

The second difference of FIG. 3B from FIG. 3A is that, the widths of the third electrodes 330 along the second direction (the vertical direction) are unequal. Due to routing arrangements, the conducting wires of the first electrodes 312 and the second electrodes 322 are closely adjacent to other electrodes or conducting wires, such that a planar contour of the third electrodes 330 has a gradually increasing width from top to bottom. In one embodiment, as gaps exist between the conducting wires, a plurality of dummy electrodes 330 may be arranged in these gaps between the conducting wires. Associated details are to be given with reference to FIG. 4A to FIG. 4E shortly.

Figure 3C:
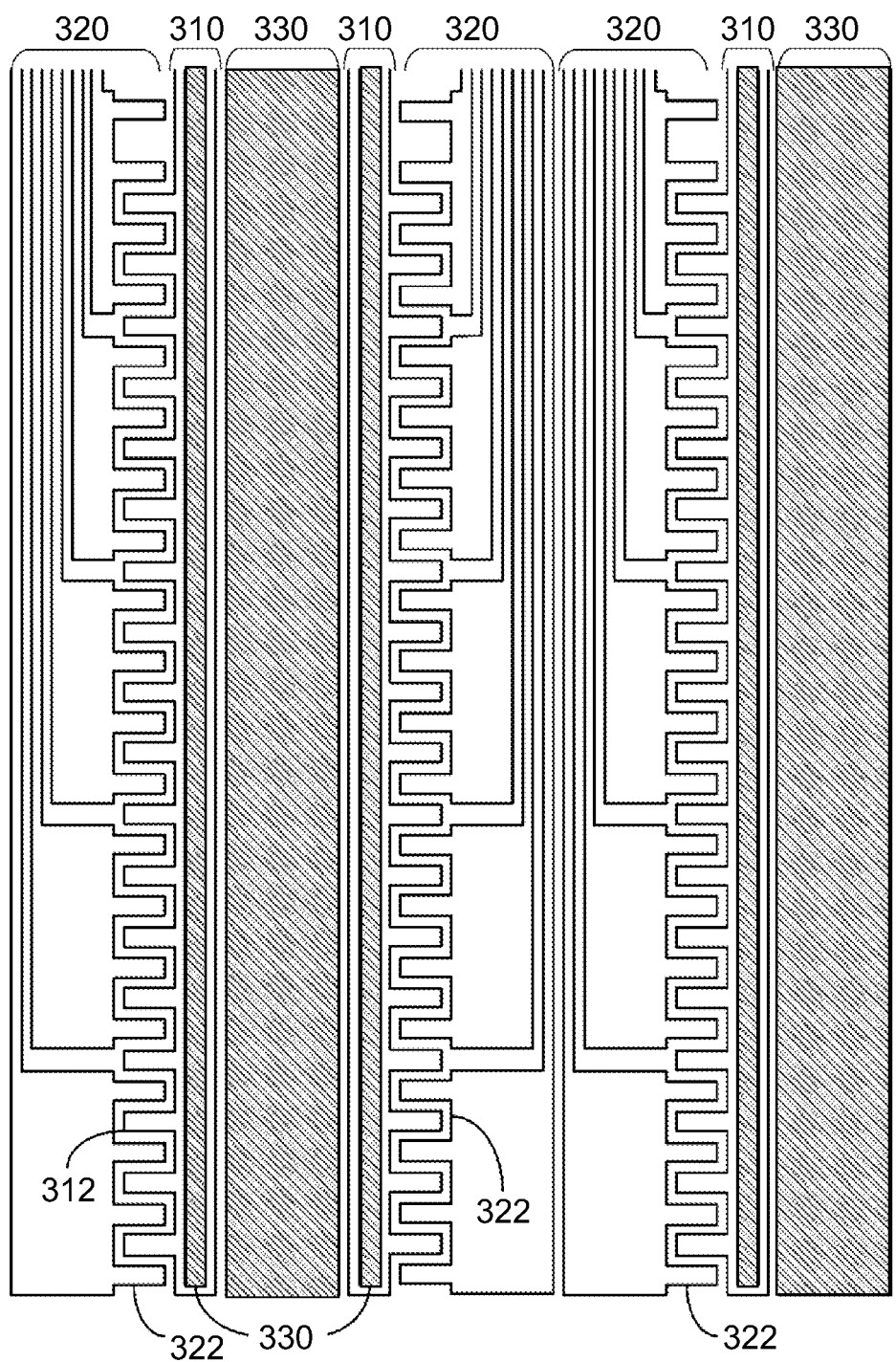
FIG. 3C is a schematic diagram of an electrode arrangement on a single layered substrate according to an embodiment of the present invention.

FIG. 3C shows a schematic diagram of an electrode arrangement on a single layered substrate according to an embodiment of the present invention. Compared to FIG. 3A and FIG. 3B, each of the first electrode groups 310 in FIG. 3C may include one single first electrode 312 and at least one first electrode conducting wires. Between the first electrode and the first electrode conducting wire may be the third electrode 330. The second electrodes 312 and the third electrode conducting wires of the second electrode groups 310 may be arranged as those in FIG. 3C or as those in FIG. 3B. One person skilled in the art can understand that the above arrangements of the conducting wires are non-limiting examples for illustrating the present invention, and the present invention does not limit the arrangement of the conducting wires.

Figure 4A:
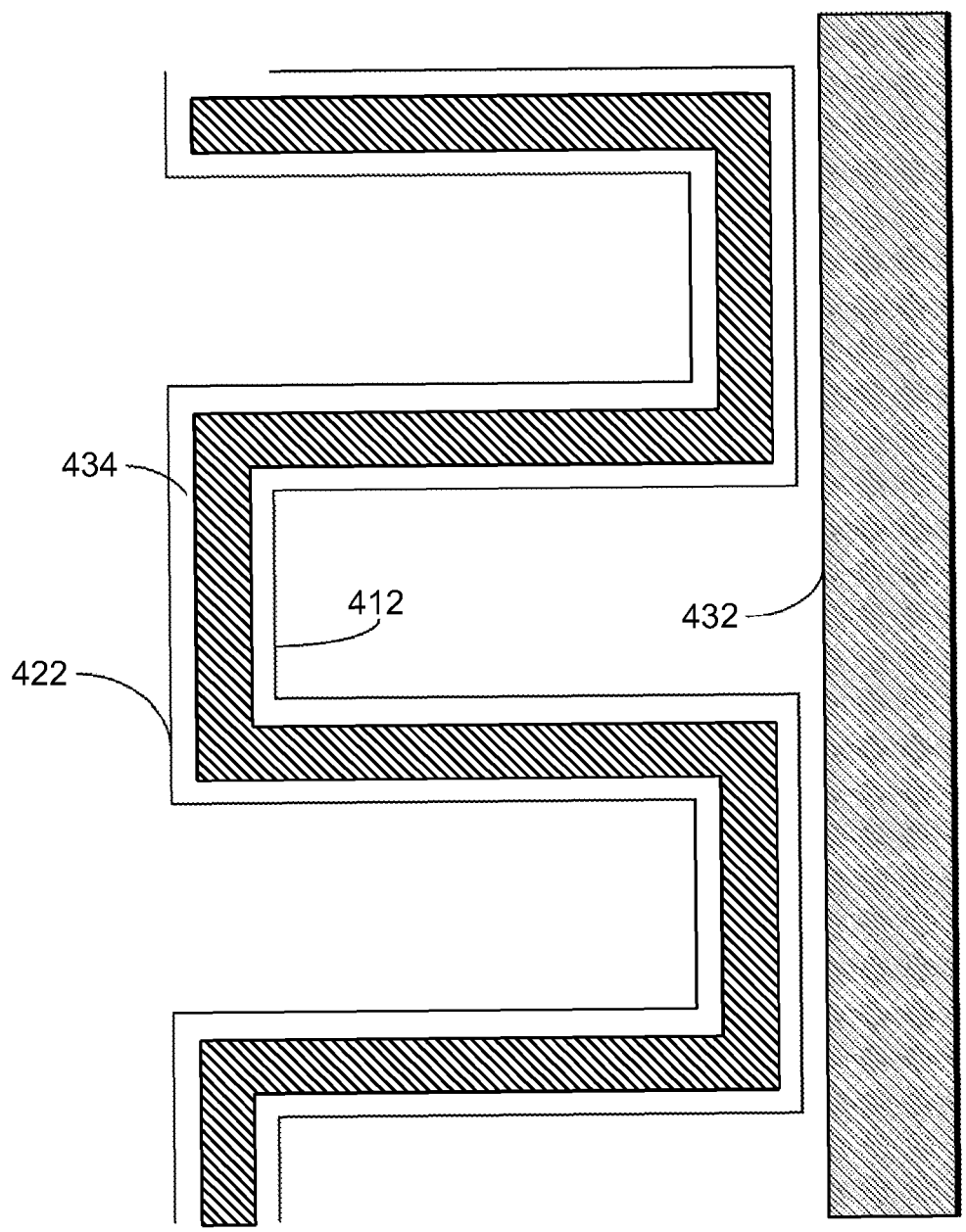
FIG. 4A is a schematic diagram of an electrode arrangement on a single layered substrate according to an embodiment of the present invention.

FIG. 4A shows a schematic diagram of an electrode arrangement on a single layered substrate according to an embodiment of the present invention. FIG. 4A may be regarded as an enlarged partial view of FIG. 3A to FIG. 3C. The electrode arrangement in FIG. 4A includes a first electrode 412, a second electrode 422, a ground electrode 432 and a dummy electrode 434. As previously stated, the first electrode 412 and the second electrode 422 respectively have a plurality of twigs that are located at corresponding positions. The ground electrode 432 may be disposed next to the first electrode 412 or the second electrode 422. The dummy electrode 434 may be disposed at a complementary area of the first electrode 412 and the second electrode 422. One person skilled in the art can understand that, in addition to the positions shown in FIG. 4A, the dummy electrode 434 may also be disposed between the first electrode 412 and the conducting wire, and between the second electrode 422 and the conducting wire.

Figure 4B:
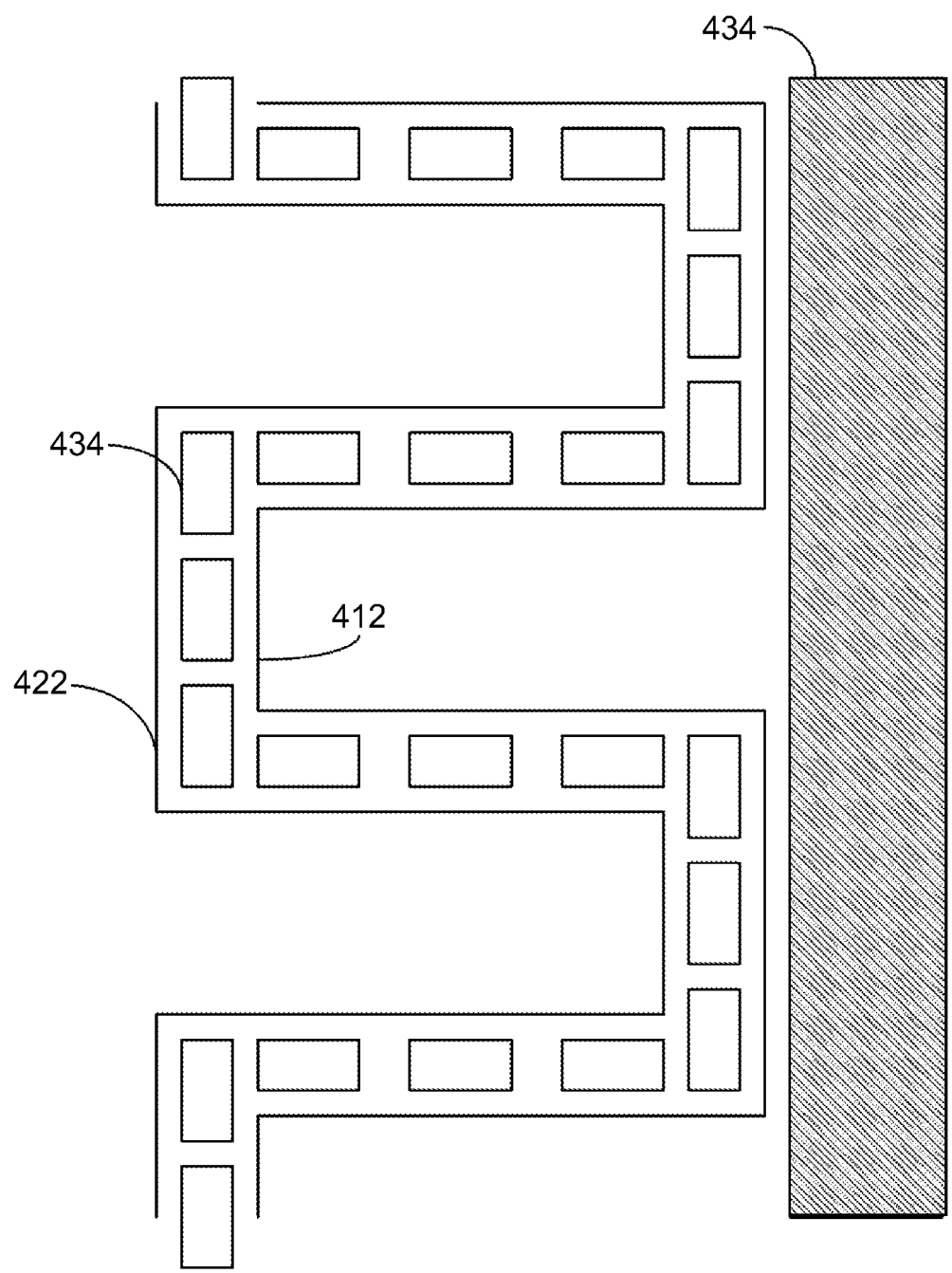
FIG. 4B is a schematic diagram of an electrode arrangement on a single layered substrate according to an embodiment of the present invention.

FIG. 4B shows a schematic diagram of an electrode arrangement on a single layered structure according to an embodiment of the present invention. A difference of FIG. 4B from FIG. 4A is that, a plurality of dummy electrodes 434 may be disposed at a complementary area of the first electrode 412 and the second electrode 422. Areas and sizes of the dummy electrodes 434 may be the same to facilitate a design process.

Figure 4C:
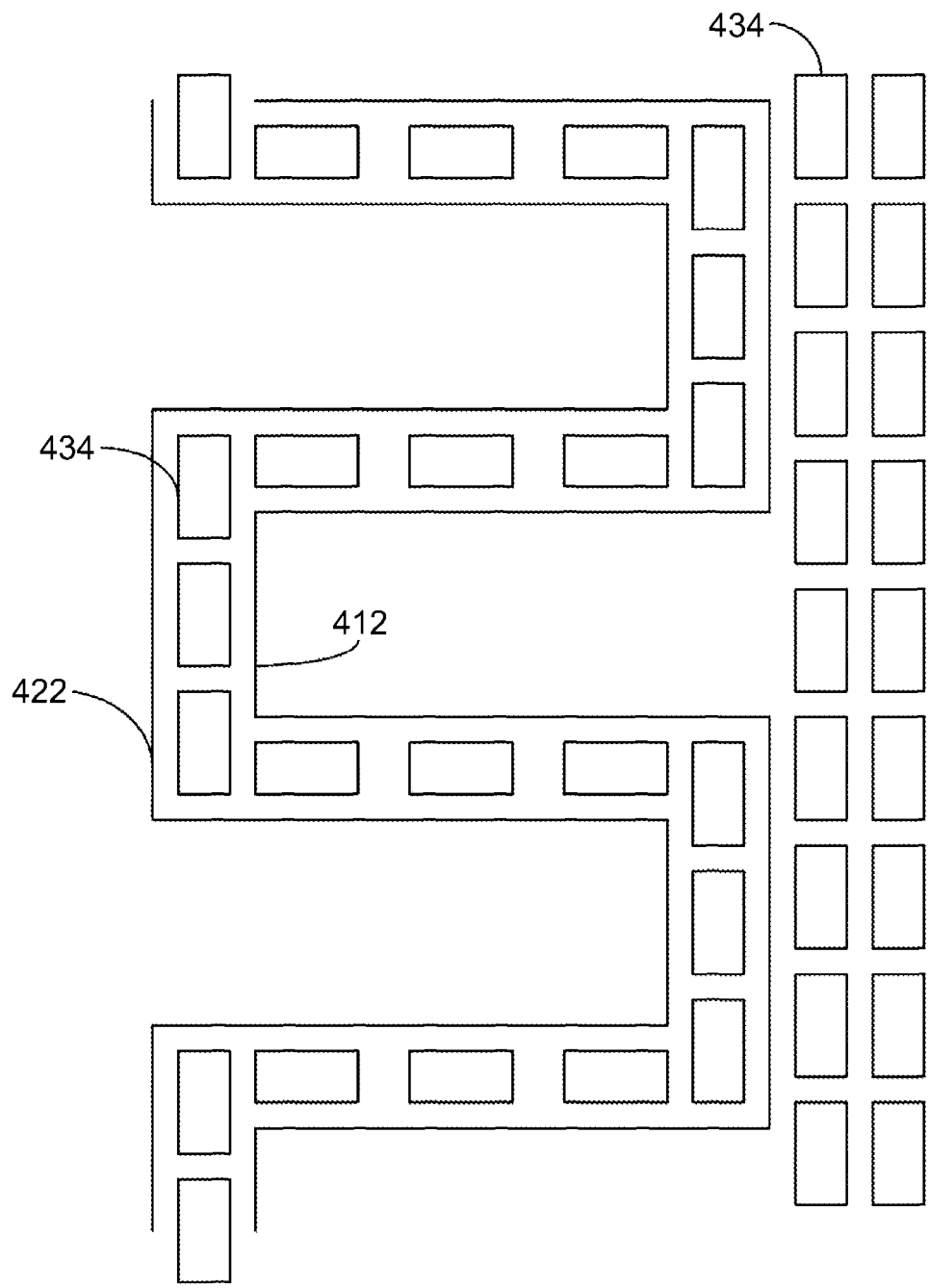
FIG. 4C is a schematic diagram of an electrode arrangement on a single layered substrate according to an embodiment of the present invention.

FIG. 4C shows a schematic diagram of an electrode arrangement on a single layered structure according to an embodiment of the present invention. A difference from embodiment shown in FIG. 4B is that, the embodiment in FIG. 4C does not include any ground electrode 432. The ground electrode 432 in FIG. 4B is replaced by a plurality of dummy electrodes 434. Similar to FIG. 4B, areas and sizes of the dummy electrodes 434 in FIG. 4C are the same.

Figure 4D:
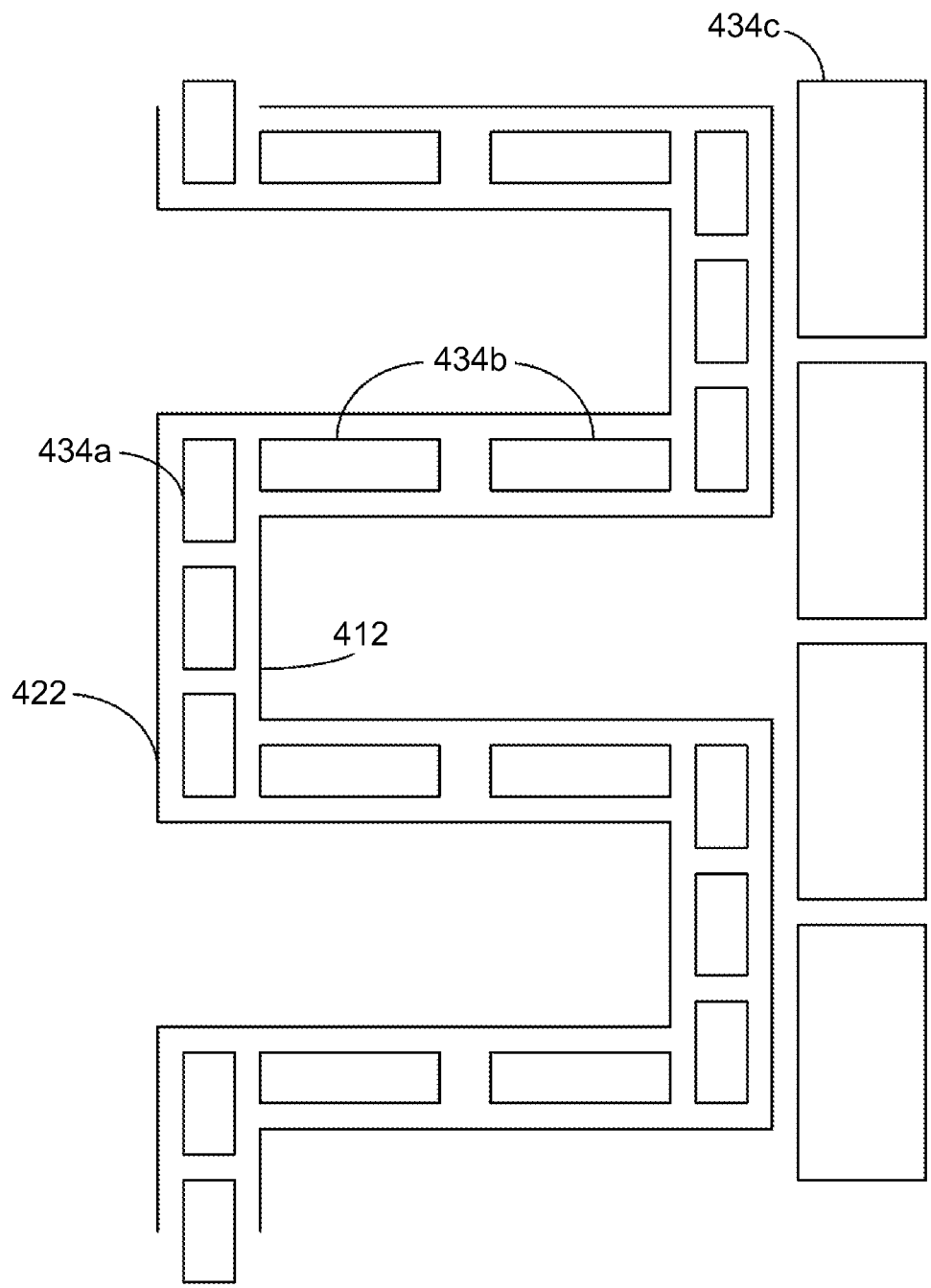
FIG. 4D is a schematic diagram of an electrode arrangement on a single layered substrate according to an embodiment of the present invention.

FIG. 4D shows a schematic diagram of an electrode arrangement on a single layered structure according to an embodiment of the present invention. A difference from embodiment shown in FIG. 4C is that, areas and sizes of the dummy electrodes in the embodiment in FIG. 4D may be different. Arranged according to the areas and sizes, a smallest dummy electrode 434a, a dummy electrode 434b and a dummy electrode 434c are sequentially arranged.

Figure 4E:
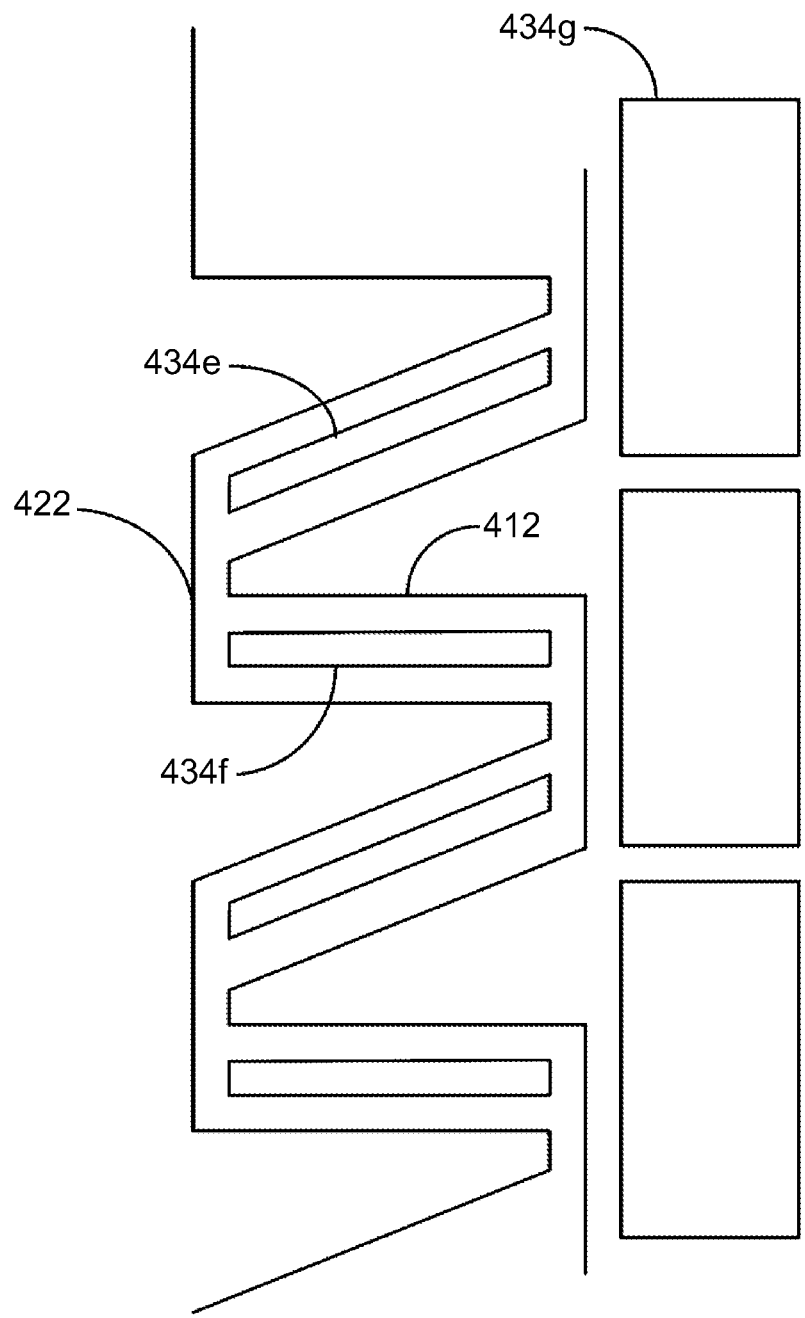
FIG. 4E is a schematic diagram of an electrode arrangement on a single layered substrate according to an embodiment of the present invention.

FIG. 4E shows a schematic diagram of an electrode arrangement on a single layered structure according to an embodiment of the present invention. A main difference of FIG. 4E from FIG. 4A to FIG. 4D is that, instead of including twigs, each of the first electrodes 412 and the second electrodes 422 in FIG. 4E includes triangular, triangle-like trapezoidal, or triangle-like polygonal electrodes. One person skilled in the art can understand that, due to limitations of manufacturing techniques, manufacture of a twig forming with the electrode an angle smaller than a certain angle may have a greater failure rate. Therefore, an angle between the twig and the electrode shall be maintained greater than the certain angle. In the embodiment in FIG. 4E, a plurality of dummy electrodes 434e may be disposed at a complementary area of the first electrode 412 and the second electrode 422. Further, a plurality of dummy electrodes 434g may be disposed next to the first electrode 412 and/or the second electrode 422.

Under certain circumstances where grounding between a human body and the ground are non-ideal, the capacitance change ΔCm may be reduced, in a way that a detection result of a proximity event may become inaccurate. An advantage of adding the design of a ground electrode is that, the grounding between the human body and the ground can be improved. Thus, the ratio of the capacitance change ΔCm can be enlarged to improve the accuracy in the detection result of a proximity event.

In other circumstances, water drops may be present on the touch device. Positions where the water drops are present may be misjudged as positions of proximity events taking place. Another advantage of adding the ground electrode is that, given a satisfactory design in a linewidth of the ground electrode, the possibility of misjudging the water drops as proximity events may also be reduced.

Proven by simulation experiments, for a touch area of a touch device divided into grids, the capacitance change ΔCm of a grid corresponding to the proximity event is increased after adding the design of the dummy electrode. As such, the total capacitance change of surrounding grids of the grid corresponding to the proximity event is significantly increased. With the ground electrode added in a condition of a floating voltage, a result in a negative value representing the total capacitance value of other grids is not caused.

In conclusion, a main spirit of the present invention is to add a ground electrode and/or a dummy electrode in a space outside driving electrodes and sensing electrodes on a single layered substrate. Accordingly, when a proximity event takes place, a capacitance value of an external conductive object relative to a ground potential is increased to increase a capacitance change between the driving electrode and sensing electrode, thereby improving an SNR of the proximity event.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A single layered electrode structure, comprising:
    a plurality of first electrode groups arranged along a first direction, each of the first electrode groups comprising at least one first electrode arranged along a second direction;
    a plurality of second electrode groups arranged along the first direction, each of the second electrode groups comprising a plurality of second electrodes arranged along the second direction, wherein each of the first electrodes at least corresponds to the at least one first electrode;
    a plurality of third electrodes arranged along the first direction, each of the third electrodes located between two of the first electrode groups, between two of the second electrode groups, or between one of the first electrode group and one of the second electrode group
    wherein the single layered electrode structure generates a plurality of capacitance sensing results when an external conductive object comes into proximity to said single layered electrode structure, the plurality of capacitance sensing results comprising:
        a first capacitance value $C_m$ between the first electrode group and the second electrode group;
        a second capacitance value $C_d$ between the external conductive object and the first electrode group;
        a third capacitance value $C_s$ between the external conductive object and the second electrode group;
        a fourth capacitance value $C_{f1}$ between the external conductive object and third electrode, when the external conductive object is grounded;
        a fifth capacitance value $C_{f2}$ between the external conductive object and the third electrode;
        a sixth capacitance value $C_f$ between the external conductive object and a ground, wherein the sixth capacitance value $C_f$ comprises a sum of the fourth capacitance value $C_{f1}$ and the fifth capacitance value $C_{f2}$; and
        a capacitance change $\Delta C_m$ between said plurality of first electrodes and the plurality of second electrodes, wherein a sensing amount of an overall mutual capacitance is represented by an equation:

$$\Delta C_m + C_s * C_d/(C_s + C_d + C_f).$$

2. The single layered electrode structure according to claim 1, wherein the plurality of third electrodes comprise any combination of:
    a ground electrode connected to a ground potential; and
    a dummy electrode not coupled to any external wires.

3. The single layered electrode structure according to claim 2, wherein when each of the third electrodes comprises a plurality of dummy electrodes, sizes of the dummy electrodes are substantially the same.

4. The single layered electrode structure according to claim 2, wherein when each of the third electrodes comprises a plurality of dummy electrodes, at least two of the dummy electrodes are different in size.

5. The single layered electrode structure according to claim 2, wherein a distance along the first direction between respective centers of two neighboring third electrodes is between 5 mm and 7 mm.

6. The single layered electrode structure according to claim 2, further comprising a plurality of third electrodes located between the at least one first electrode and the plurality of second electrodes.

7. The single layered electrode structure according to claim 1, wherein a plurality of first electrode conducting wires of the at least one first electrode are located along the second direction at one side of the first electrode group, and a plurality of second electrode wires of the plurality of second electrodes are located along the second direction at one side of the second electrode group.

8. The single layered electrode structure according to claim 1, wherein each of the first electrodes comprises a plurality of twigs, each of the second electrodes comprises a plurality of twigs, and a part of the plurality of twigs of each of the first electrodes correspond to a part of the plurality of twigs of each of the second electrodes.

9. The single layered electrode structure according to claim 1, wherein each of the first electrodes comprises a plurality of triangle-like curved electrodes, each of the second electrodes comprises a plurality of triangle-like curved electrodes, and a part of the plurality of triangle-like curved electrodes of each of the first electrodes correspond to a part of the plurality of triangle-like curved electrodes of each of the second electrodes.

10. The single layered electrode structure according to claim 9, wherein the triangle-like curved electrodes comprise one of planar contours of:
   a triangle; and
   a triangle-like trapezoid.

11. The single layered electrode structure according to claim 1, wherein an order arranged along the first direction is:
   the second electrode group;
   the first electrode group;
   the third electrode;
   the first electrode group; and
   the second electrode group.

12. The single layered electrode structure according to claim 1, wherein an order arranged along the first direction is:
   the third electrode;
   the second electrode group; and
   the first electrode group.

13. The single layered electrode structure according to claim 1, wherein an order arranged along the first direction is:
   the third electrode;
   the first electrode group; and
   the second electrode group.

14. The single layered electrode structure according to claim 1, wherein the plurality of first electrode groups are driving electrodes, and the plurality of second electrode groups are sensing electrodes.

15. The single layered electrode structure according to claim 1, wherein the first direction is orthogonal to the second direction.

16. The single layered electrode structure according to claim 1, wherein a plurality of first electrode conducting wires of the at least one first electrode are located along the second direction at one side of the first electrode group, a plurality of second electrode wires of the plurality of second electrodes are located along the second direction at one side of the second electrode group, and widths of the plurality of third electrodes along the first direction increase along the second direction.

* * * * *